Sept. 27, 1949.  L. H. ALLEN, JR  2,482,830
PRODUCTION OF ANHYDROUS SODIUM SULFATE
Filed Aug. 23, 1945
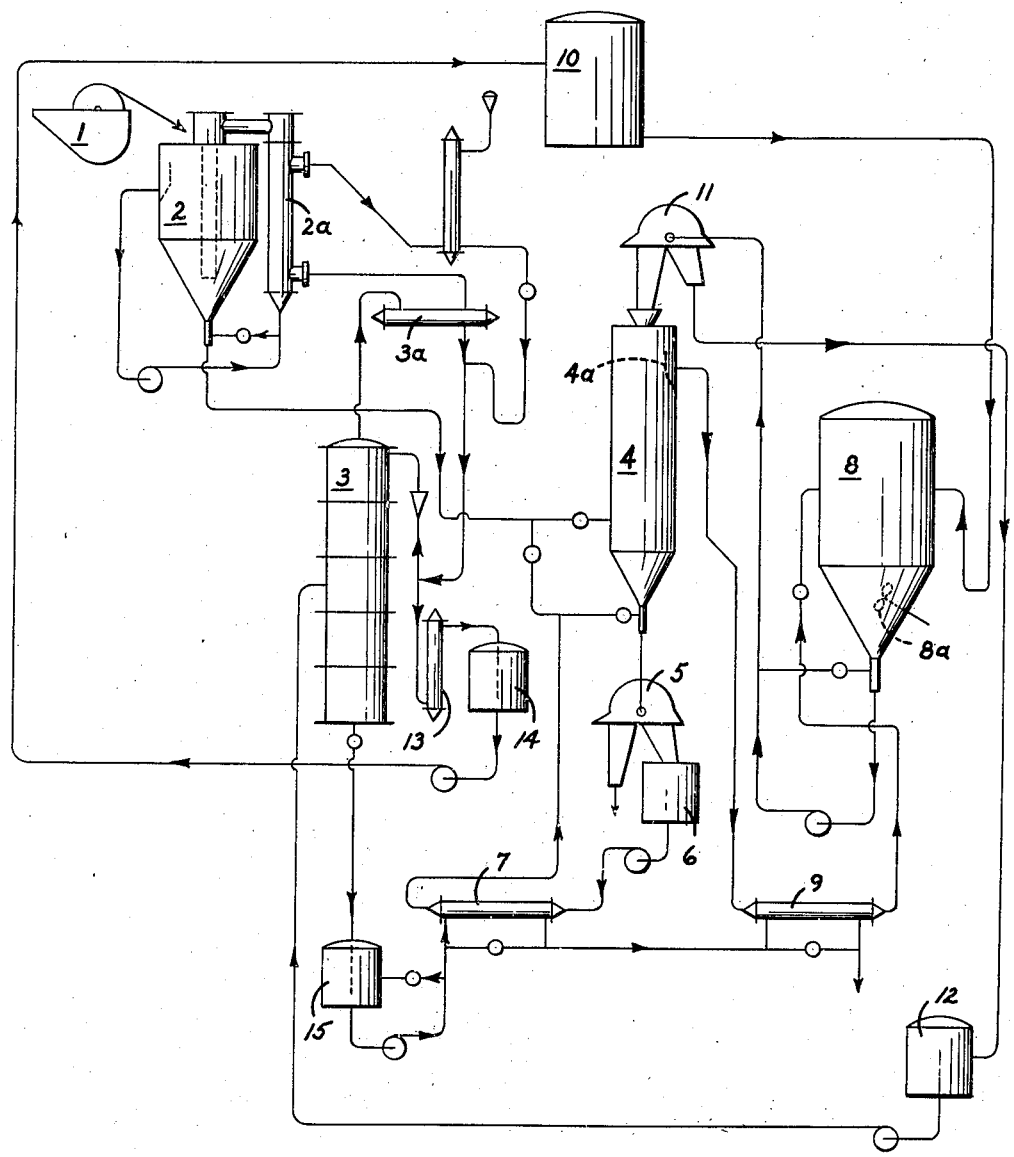
Lyman H. Allen, Jr.
INVENTOR.
BY Carl A. Castellan
atty.

Patented Sept. 27, 1949

2,482,830

UNITED STATES PATENT OFFICE 2,482,830

PRODUCTION OF ANHYDROUS SODIUM SULFATE

Lyman H. Allen, Jr., Swarthmore, Pa., assignor to American Viscose Corporation, Wilmington, Del., a corporation of Delaware Application August 23, 1945, Serial No. 612,277

9 Claims. (Cl. 23—121)

This invention relates to a method for converting a hydrated salt to a less hydrated form. Although the method of this invention is capable of more general application, it will be described with particularity in connection with the conversion of sodium sulfate decahydrate to anhydrous sodium sulfate.

Many processes have been suggested for converting Glauber's salt, the decahydrate, to the anhydrous form, for which there is a greater commercial market, but all such processes have involved conditions which prevent either economical large scale operation, or continuous operation over prolonged periods of time.

Thus, one such process involves allowing the Glauber's salt to melt and then exposing it to the atmosphere and evaporating off the water at temperatures above about 32.4° C., which is the transition temperature above which Glauber's salt is unstable and loses water to form anhydrous sodium sulfate. The large working space required for carrying out that procedure when any appreciable quantity of Glauber's salt is involved, and the extremely slow rate of evaporation, preclude the adoption of that method for large scale operations. It has also been proposed to boil off the water to hasten the evaporation, and thereafter dry the residue by calcination. That process, however, does not represent any improvement over the simple evaporation method so far as practicality is concerned, because unless the mass is constantly stirred and manipulated the anhydrous sodium sulfate cakes on the heating coils and other heating surfaces of the boil-off evaporator, and is extremely difficult to remove.

Still another procedure suggested involves mixing Glauber's salt with a hot saturated solution of sodium sulfate and allowing the anhydrous sodium sulfate to settle, after which the supernatant liquor is run off into an evaporator to remove water. The disadvantage of that process is that the temperature in the evaporator is higher than that in the converter, and, due to the inverted solubility, as soon as the liquor introduced into the evaporator approaches the temperature of the evaporator, anhydrous salt is precipitated and deposited on the evaporator surfaces where it is baked into a hard, cement-like coating. Additional quantities of anhydrous salt precipitate out as the water is vaporized, with the result that a normal magma density of about 5% is carried in the evaporator at all times, resulting in a progressive fouling of the heating surfaces. Actual experience has been that in a relatively short time the evaporator becomes so clogged that the process cannot be continued, necessitating shut-down of the evaporator after only about ten or twelve hours' operation. The solution in the evaporator must then be drained back to the converter, and the evaporator filled up with water which is boiled to redissolve the salt accumulated on the heating surfaces. This boiling out operation produces a dilute solution of sodium sulfate, which, to satisfy the demands of economy, must be mixed with the liquor reintroduced from the converter which increases the total evaporation load considerably, requiring a longer time to evaporate the water, and adding generally to the inefficiency of the process.

The possiblity of caking of the anhydrous salt when water is boiled off melted Glauber's salt, or the formation of incrustations on the heating surfaces when a concentrated sodium sulfate solution is treated in a boil-off evaporator to restore it to the saturated condition is not positively eliminated even when the most careful attention is given to equipment design.

The object of the present invention is to provide a method for the conversion of Glauber's salt to anhydrous sodium sulfate which does not involve any substantial evaporation of water from solutions containing any appreciable quantity of sodium sulfate.

Broadly speaking the conversion process of the invention comprises treating a saturated sodium sulfate solution with an organic liquid precipitant having a boiling point below the boiling point of water and preferably in the range of 50° C. to 80° C. to precipitate the sodium sulfate in the anhydrous form.

The saturated sodium sulfate solution is maintained at a carefully controlled moderate temperature which is above the transition temperature for the decahydrate and well below the boiling point of water, as well as below the boiling point of the organic liquid precipitant. The exact temperature at which the saturated sodium sulfate solution is maintained depends, other things being considered, upon the boiling point of the organic solvent precipitant.

In a preferred embodiment of the invention, Glauber's salt is introduced into a saturated sodium sulfate solution maintained at a temperature which is controlled within the limits generally set forth above.

At the start of operations, the saturated sodium sulfate solution is maintained at the desired temperature by circulating it through a heating element which is heated by steam, and controlling the rate of flow of cooling water through a condenser associated with the heater so that all steam in excess of that required to maintain the solution at the required temperature is removed from the heater and condensed in the condenser, only sufficient heat being transferred to the solution to restore heat lost during the endothermic action of melting the Glauber's salt. The temperature of the solution travelling through the heater is thus controlled so that it is kept safely within the metastable zone for the decahydrate that is above the transition temperature, and at the saturation point, thus preventing scaling or clogging of the heater surfaces due to either crystal growth or precipitation of the anhydrous salt. At a later point in the process, when equilibrium has been established, the steam is replaced by organic solvent vapors, as will be more fully explained hereinafter, which even more certainly assures a low temperature differential as between the heating element and the saturated sodium sulfate solution circulating therethrough. The accompanying drawing is illustrative of the invention, a preferred embodiment thereof being shown in flow sheet form.

Referring to the drawing, Glauber's salt is continuously fed from a filter 1 into a melting unit 2 filled with a saturated sodium sulfate solution which has been heated to a temperature above the transition temperature for the decahydrate and below the boiling point of water by circulating it through a heating element 2a heated with organic solvent vapors from a distilling column 3. The temperature to which the solution is heated is also below the boiling point of the organic solvent precipitant to be used at a later step in the process. The solution in melter 2 is maintained automatically at the controlled temperature by regulating the rate of flow of cooling water through condenser 3a, all steam in excess of that required to maintain the heater 2a at the required temperature being condensed in the condenser. About two-thirds of the Na$_2$SO$_4$ in the entering Glauber's salt is dissolved in its own water of crystallization, and about one-third thereof precipitates to the bottom of vessel 2 as anhydrous sodium sulfate. A portion of the saturated solution sufficient to maintain the desired liquid level in vessel 2 is withdrawn from vessel 2, as a slurry with the precipitated anhydrous salt, and the slurry is pumped to a washing tower 4 where the suspended anhydrous salt settles to the cone-shaped bottom and is withdrawn, centrifuged in centrifuge 5 to remove excess liquor and subsequently dried and stored. The liquor removed in centrifuge 5 is collected in a tank 6 and pumped back to washing tower 4 through a heater 7 to maintain the solution at the required temperature. Preferably a small portion of that liquor is introduced, on its return journey, into the cone-shaped bottom of the tower, in order to provide sufficient agitation for the anhydrous salt which settles there to prevent caking of the latter, while not seriously hindering the settling process. As the operation proceeds, and a slurry of anhydrous sodium sulfate and saturated sodium sulfate solution is continuously forwarded from vessel 2 to tower 4, the liquor builds up in the tower and finally overflows a weir 4a from which it flows by gravity to a heater 9, where the solution is again adjusted to the desired temperature above the transition temperature and below the boiling point of water and of the organic solvent precipitant and thence upwardly to a precipitator 8 provided with an agitator 8a. The organic solvent precipitant is introduced to the precipitator from tank 10 and thoroughly mixed with the sodium sulfate solution, while the solution is maintained at the controlled temperature to precipitate anhydrous sodium salt selectively. The resulting anhydrous salt-organic solvent-water slurry is pumped from the bottom of precipitator 8 to a centrifuge 11 where the anhydrous sulfate is separated from water and the organic solvent. The anhydrous salt is then introduced into the top of column 4. As it travels downwardly through the tower, the salt is washed, counter-current wise, by saturated sodium sulfate solution which has been withdrawn with precipitated anhydrous salt from the melting unit and separated therefrom. The washing action of the sodium sulfate solution removes any residual organic solvent clinging to the anhydrous salt, and the anhydrous salt settles at the bottom of the tower and is withdrawn for drying and storage.

There is thus maintained a constant flow of saturated sodium sulfate solution from vessel 2 through washing tower 4 to precipitator 8, and a constant return flow of anhydrous sodium sulfate from the precipitator to the washing tower which is conservative of the organic solvent precipitant and avoids waste thereof. The water and organic solvent separated from the anhydrous salt in centrifuge 11 is collected in a tank 12, pumped to the distillation column 3, where the organic solvent is distilled off and recycled through condenser 3a; then partly through heater 2a and the remainder through cooler 13 and tank 14 back to tank 10 for re-use. The water from still 3 is passed to reservoir 15 and is used for heating the heating elements 7 and 9 before being discarded. It will be observed that the arrangement is such that, when a point of equilibrium has been reached, a controlled portion of the organic solvent vapors escaping from the top of the distilling column are used directly as a heating medium for heater 2a. Advantage is thus taken of these vapors as a heating means to insure maintenance of the temperature of the heater such that a low temperature differential exists between the heater and the saturated sodium sulfate solution circulating therein without requiring the use of a vacuum in the distillation step.

The precipitant used in accordance with this invention is an organic liquid which is completely soluble in water, does not dissolve inorganic salts, which has a boiling point below the boiling point of water and preferably in the range of 50° C. to 80° C. at atmospheric pressure, and which is characterized by low viscosity, comparatively high flash point, low specific heat, and latent heat of vaporization in the range of 150 to 250 B. t. u. per pound. Examples of suitable solvents are acetone, ethyl alcohol, isopropanol, etc.

The amount of organic solvent to be used as precipitant may be raised considerably, depending upon the particular solvent used and, generally speaking, the greater the amount of organic solvent used the greater is the yield of anhydrous sodium sulfate.

Taking acetone as an example, the saturated sodium sulfate solution is maintained at a controlled temperature of about 40° C. to 45° C., and the acetone may be added to the solution in the precipitator in amounts varying from about 9% to 50% by weight of the Glauber's salt entering, to obtain yields of anhydrous sodium sulfate ranging from about 37% to 97.5% of the sodium sulfate present in the solution in the precipitator.

The great advantage of the foregoing process is that water is not vaporized from a solution containing any appreciable quantity of sodium sulfate and thus the need for heavy boil-off evaporators or like apparatus with attendant caking and clogging difficulties is entirely eliminated and the operations may be continuously carried out for indefinite periods. The only water vaporized is that separated with the organic solvent from the anhydrous sulfate thrown down in the precipitator which water, in the preferred embodiment of the invention, in accordance with which sufficient organic solvent is mixed with the saturated solution to precipitate all of the sulfate as anhydrous salt, contains merely slight traces of the solute. Further, all steps of the process may be carried out under atmospheric pressure, which permits the use of vessels constructed of comparatively light weight materials and makes possible a substantial reduction in equipment and operating costs.

The conversion process of this invention may be used in connection with Glauber's salt from any source but is particularly well adapted to the conversion of Glauber's salt obtained from the coagulating and precipitating baths used in the manufacture of artificial fibers from viscose.

The invention may be applied to various types of salt hydrates, whether having a positive, normal solubility curve or an inverted solubility curve, including, in addition to Glauber's salt, such other salts, as the hydrates of sodium carbonate, barium chloride, cupric sulfate, etc. Instead of acetone, other organic solvents precipitants for the anhydrous form of the salt may be used as, for example, methyl alcohol, ethyl alcohol, isopropanol, ethylene glycol, acetonyl acetone, carbitol, triethylene tetramine, morpholine, etc., solvents having a boiling point below the boiling point of water being preferred.

Although the invention has been described as applied to the particular case where the anhydrous form of the salt is precipitated from a saturated solution of the salt, it may also be practiced in connection with precipitation of the salt from solutions which are not saturated.

I claim:

1. In a process of dehydrating a hydrated salt, the steps comprising treating a solution of the salt with an organic liquid which precipitates the anhydrous form of the salt while maintaining the solution at a temperature above the transition temperature for the hydrated salt and below the boiling point of the organic liquid precipitant, separating the precipitated anhydrous salt from the organic liquid-water mixture, separating the organic liquid from water by distillation, diverting a controlled portion of the organic liquid vapors from the distillation step for use in maintaining the temperature of the salt solution above the transition temperature for the hydrated salt and below the boiling point of the precipitant, condensing the remaining portion of the organic liquid vapors and recycling the organic liquid for use in precipitating the anhydrous form of the salt from further quantities of salt solution.

2. The process for converting Glauber's salt to anhydrous sodium sulfate which comprises treating a sodium sulfate solution with an organic liquid which precipitates anhydrous sodium sulfate, said organic liquid having a boiling point below the boiling point of water while maintaining, the solution at a temperature above the transition temperature for the decahydrate and below the boiling point of the organic liquid, separating the precipitated anhydrous sodium sulfate from the organic liquid-water mixture, separating the organic liquid from the water by distillation, diverting a controlled portion of the organic liquid vapors from the distillation step for use in maintaining the temperature of the sodium sulfate solution above the transition temperature for the decahydrate and below the boiling point of the precipitant, condensing the remaining portion of the organic liquid vapors, and recycling the organic liquid for use in precipitating anhydrous sodium sulfate from further quantities of sodium sulfate solution.

3. A process for converting Glauber's salt to anhydrous sodium sulfate which comprises treating a sodium sulfate solution with acetone, the solution being maintained at a temperature above the transition temperature of the decahydrate, separating acetone and water from the precipitated anhydrous sodium sulfate, distilling off the acetone from the water diverting a controlled portion of the acetone vapors from the distillation step for use in maintaining the temperature of the sodium sulfate solution above the transition temperature for the decahydrate, condensing the remaining portion of the acetone vapors, and recycling the acetone for use in precipitating anhydrous sodium sulfate from further quantities of saturated sodium sulfate solution.

4. A process for converting Glauber's salt to anhydrous sodium sulfate which comprises melting Glauber's salt in a saturated sodium sulfate solution maintained at a temperature above the transition temperature of the decahyrate, withdrawing the anhydrous sodium sulfate thus precipitated in a slurry with a portion of the saturated solution, separating the anhydrous salt from the solution, mixing the saturated solution separated from the anhydrous salt with acetone at a temperature above the transition temperature of the decahydrate to precipitate anhydrous sodium sulfate, and thereafter washing the anhydrous salt precipitated by the acetone by passing it counter-currentwise to that portion of the saturated sodium sulfate solution resulting from melting of the Glauber's salt which is withdrawn in said slurry.

5. A process for converting Glauber's salt to anhydrous sodium sulfate which comprises melting Glauber's salt in a saturated sodium sulfate solution maintained at a temperature of 40 to 45° C., withdrawing the anhydrous sodium sulfate thus precipitated in a slurry with a portion of the saturated solution, separating the anhydrous sulfate from the slurry, withdrawing the anhydrous sodium sulfate, separating the salt from the portion of saturated solution clinging thereto, combining that portion of the solution with the portion of the solution separated from the anhydrous salt in the first instance, mixing the combined portions of the saturated solution with acetone at a temperature of 40° C. to 45° C. to precipitate the sodium sulfate remaining therein as anhydrous sodium sulfate, and thereafter washing the anhydrous salt precipitated by the acetone by passing it counter-currentwise to that portion of the saturated sodium sulfate solution resulting from melting of the Glauber's salt which is withdrawn in said slurry.

6. Process for converting Glauber's salt to anhydrous sodium sulfate which comprises melting Glauber's salt in a saturated sodium sulfate solution maintained at a temperature of about 40° C. to 45° C., withdrawing the anhydrous salt thus precipitated in a slurry with a portion of the saturated solution, separating the anhydrous salt from the solution, mixing the saturated solution separated from the anhydrous salt with acetone at a temperature of about 40° C. to 45° C. to precipitate the sodium sulfate as the anhydrous salt, withdrawing the thus precipitated anhydrous salt as a slurry with the acetone and water, separating the anhydrous salt and passing it counter-currentwise to that portion of the saturated sodium sulfate solution resulting from melting of the Glauber's salt which is withdrawn in said first-mentioned slurry, and separating the acetone from water by distillation.

7. Process according to claim 6 wherein a controlled portion of the acetone vapors resulting from the distillation step are used for maintaining the saturated sodium sulfate solution in which the Glauber's salt is melted at a temperature of about 40° C. to 45° C.

8. A process for the conversion of Glauber's salt to anhydrous sodium sulfate which comprises continuously feeding Glauber's salt into a saturated sodium sulfate solution maintained at a temperature of about 40° C. to 45° C. to thereby melt the Glauber's salt, continuously withdrawing the anhydrous sodium sulfate thus precipitated in a slurry with a portion of the saturated sodium sulfate solution, continuously removing the anhydrous salt from the slurry, continuously mixing the saturated solution separated from the anhydrous salt with acetone at a temperature of 40° C. to 45° C. to precipitate the sodium sulfate as anhydrous salt, and continuously passing such anhydrous salt counter-currently to that portion of the saturated sodium sulfate resulting from melting of the Glauber's salt which is withdrawn in said slurry.

9. A process for the conversion of Glauber's salt to anhydrous sodium sulfate which comprises feeding Glauber's salt into a saturated sodium sulfate solution maintained at a temperature of about 40° C. to 45° C. to thereby melt the Glauber's salt, withdrawing the anhydrous salt thus precipitated in a slurry with a portion of the saturated sodium sulfate solution, separating the anhydrous salt from the slurry, mixing the saturated solution separated from the slurry with acetone at a temperature of about 40° C. to 45° C. to precipitate the sodium sulfate as anhydrous salt in a slurry with acetone and water, passing the anhydrous salt precipitated by the acetone counter-currently to that portion of the saturated sodium sulfate solution resulting from melting of the Glauber's salt and withdrawn in said first-mentioned slurry, separating the acetone and water, and recycling the acetone for use in precipitating anhydrous sodium sulfate from saturated sodium sulfate solution.

LYMAN H. ALLEN, Jr.

REFERENCES CITED

The following references are of record in the file of this patent:

UNITED STATES PATENTS

| Number | Name | Date |
| --- | --- | --- |
| 2,052,486 | Olsen | Aug. 25, 1936 |
| 2,322,134 | Hodge | June 15, 1943 |

OTHER REFERENCES

Seidell, Solubilities of Inorganic and Organic Compounds, vol. 1, page 671, Second Edition (1919), pub. by D. Van Nostrand, New York.

Tilley et al., Acid Processes for the Extraction of Alumina, U. S. Bureau of Mines Bulletin No. 267, page 59 (1927).

Yakovkin, Chemical Abstracts, vol. 23, page 5400 (1929).

Drummond, Chemical Abstracts, vol. 25, page 5523 (1931).